US007012854B1

(12) United States Patent
Lo

(10) Patent No.: US 7,012,854 B1
(45) Date of Patent: Mar. 14, 2006

(54) METHOD FOR DETECTING EMITTED ACOUSTIC SIGNALS INCLUDING SIGNAL TO NOISE RATIO ENHANCEMENT

(75) Inventor: Pei-hwa Lo, Ramsey, NJ (US)

(73) Assignee: Honeywell International Inc., Morristown, NJ (US)

( * ) Notice: Subject to any disclaimer, the term of this patent is extended or adjusted under 35 U.S.C. 154(b) by 1826 days.

(21) Appl. No.: 07/541,876

(22) Filed: Jun. 21, 1990

(51) Int. Cl.
*H04B 1/06* (2006.01)

(52) U.S. Cl. ........................................ 367/135

(58) Field of Classification Search ................ 367/135, 367/901; 381/94, 71, 94.1, 94.2, 94.3, 71.1; 364/574.01–574.08; 324/76.29, 77 R; 702/191, 702/195, 197
See application file for complete search history.

(56) References Cited

U.S. PATENT DOCUMENTS 3,621,389 A * 11/1971 Murray ..................... 324/77 R

* cited by examiner

*Primary Examiner*—Daniel Pihulic
(74) *Attorney, Agent, or Firm*—Kurt Luther

(57) ABSTRACT

A plurality of sensors and a digital adaptive tuning filter bank are used in extracting a desired emitted signal embedded in a noisy environment. By monitoring noise statistics of the sensor signals, the digital adaptive tuning filter bank automatically adjusts its upper (to eliminate strong tonals) and lower (to eliminate background noise) thresholds to obtain a discovery frequency band. The filter bank is designed by examining the discovery band across the sensors and over a predefined period of time. The method described significantly reduces the possibilities of matching self-noise transients (unwanted signals) and thus minimizes the false alarm rate in emitted signal recognition.

17 Claims, 9 Drawing Sheets

METHOD FOR DETECTING EMITTED ACOUSTIC SIGNALS INCLUDING SIGNAL TO NOISE RATIO ENHANCEMENT

BACKGROUND OF THE INVENTION

The detection and measurement of short, transient pulse modulated signals emitted from an acoustic signal source such as, for example, an active sonar source has been the subject of recent efforts in the array signal processing field. However, much of this effort has not addressed three important practical issues: (1) how low the signal to noise ratio is (less than −10 dB); (2) the existence of self-noise transient signals; and (3) the presence of strong tonals. Therefore, prior art signal models and detection methods have not performed satisfactorily when applied to detecting, for example, actual underwater acoustic signals.

In an actual underwater environment, machinery installed on surface ships and submarines, for example, inevitably generates a variety of harmonic resonance signals. These signals are called tonals. Tonals detected by an acoustic receiver can be much stronger than the emitted signal. Due to various underwater biological effects and flow induced resonances, self-noise transient signals can also interfere with the performance of the acoustic receiver.

Experimental data indicates that self-noise transient signals appear very similar to the emitted signal in the time domain. Some known characteristics of self-noise transient signals include: (1) their arrival time can be modelled using Poisson distribution; (2) their frequency is randomly distributed; and (3) their duration varies from a few milliseconds to a few hundred milliseconds.

Existence of self-noise transient signals is a major factor which contributes to the degradation of the false alarm rate performance of an underwater acoustic receiver. The duration of a pulse modulated emitted signal can be as short as a few milliseconds and as long as one second. Multipath delays also interfere with the emitted signal. Since it is desirable to provide a long range detection capability, the received emitted signal is often weak compared to environmental (noise) signals since the signal to noise ratio is low. In addition, the received emitted signal is corrupted by background "pink" noise as will be understood by those skilled in the art.

In order to detect the emitted signal and to measure its characteristics, it is necessary to enhance the aforenoted signal to noise ratio so a the reconstituted signal can be reliably recognized and measured. Since apriori knowledge of the emitted signal is not available, conventional match filter techniques will not aid in the enhancement of the signal to noise ratio. A number of developed detection algorithms have been proposed based on a statistical hypothesis test method. Unfortunately, the statistical models of self-noise transient signals are not known. Therefore, such methods are not useful.

The object of the present invention is to provide a method for detecting emitted signals which enhances the signal to noise ratio of the signals in an actual noisy environment, and which method is amenable to real time implementation.

SUMMARY OF THE INVENTION

This invention contemplates a method for detecting emitted acoustic signals including signal to noise ratio enhancement, wherein the emitted signals are distinguished from self-noise transient signals. Since the emitted signals are unsteady, the present invention features an adaptive filter technique having the capability to track the emitted signal and to enhance the signal to noise ratio, as is desired. An adaptive tuning filter bank tracks all possible signal sources and extracts the potential emitted signals. The output of the adaptive filter bank is identified for further emitted signal classification. The filter bank uses frequency domain information to track the emitted signals and is especially useful when the signal to noise ratio is very low which prohibits conventional adaptive filter techniques from being used for the desired purposes.

DETAILED DESCRIPTION OF THE INVENTION

Figure 1:
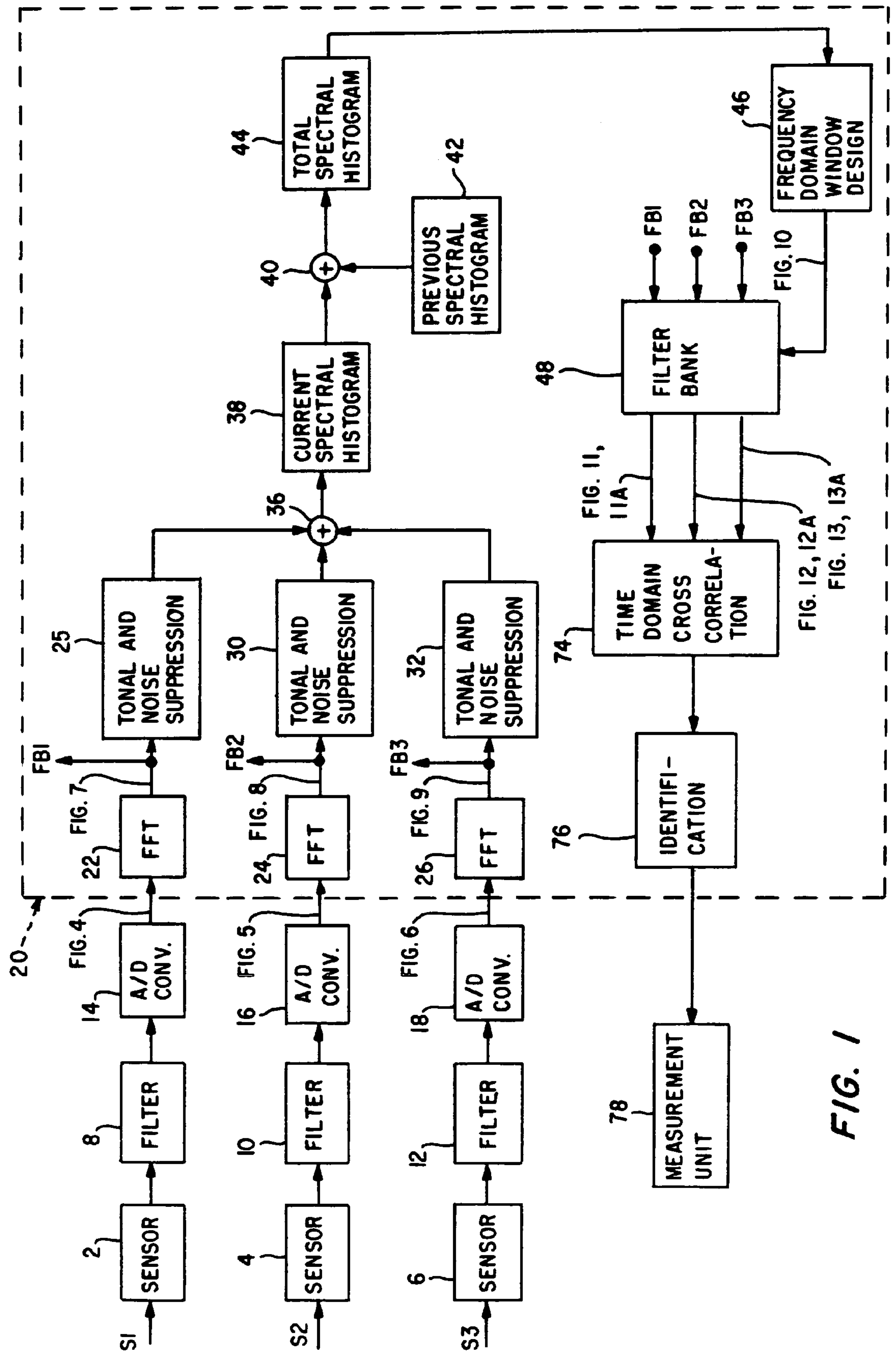
FIG. 1 is a block diagram/flow chart illustrating the method of the invention.

With reference to FIG. 1, a plurality of emitted acoustic signals, shown for purposes of illustration as three in number, are designated as S1, S2 and S3. Signals S1, S2 and S3 are short, transient pulse modulated signals emitted from a signal source such as, for example, an active sonar source. Signals S1, S2 and S3 are sensed by sensors 2, 4 and 6, respectively, which provide corresponding analog output acoustic signals.

The analog output acoustic signals from sensors 2, 4 and 6 are filtered by filters 8, 10 and 12, respectively. Filters 8, 10 and 12 are anti-aliasing low pass filters and provide band selected/limited output signals which are digitized by analog to digital (A/D) converters 14, 16 and 18, respectively. The digitized signals provided by A/D converters 14, 16 and 18 are graphically represented in FIGS. 4, 5 and 6, respectively. In this regard, reference is made to FIG. 4 which illustrates the self-noise, transient portion of the digitized signals. The digitized signals are applied to a central processing unit 20 for processing according to the invention as will be next described.

Figure 7:
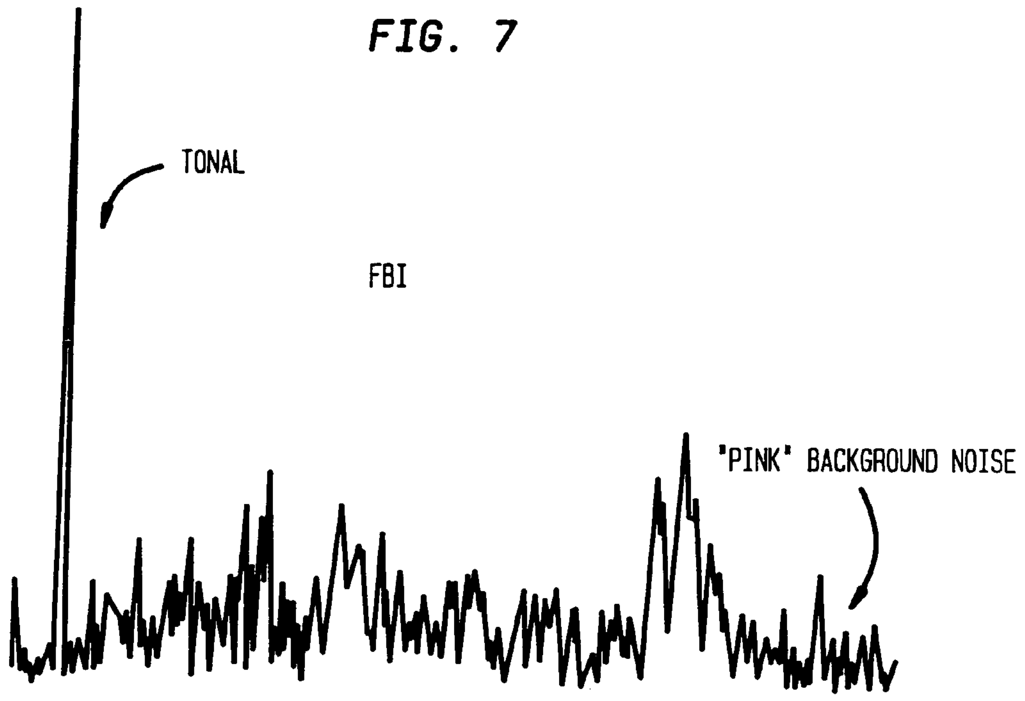
FIGS. 7, 8 and 9 are diagrammatic representations illustrating the magnitude spectra of the digitized signals illustrated in FIGS. 4, 5 and 6 respectfully.
Figure 8:
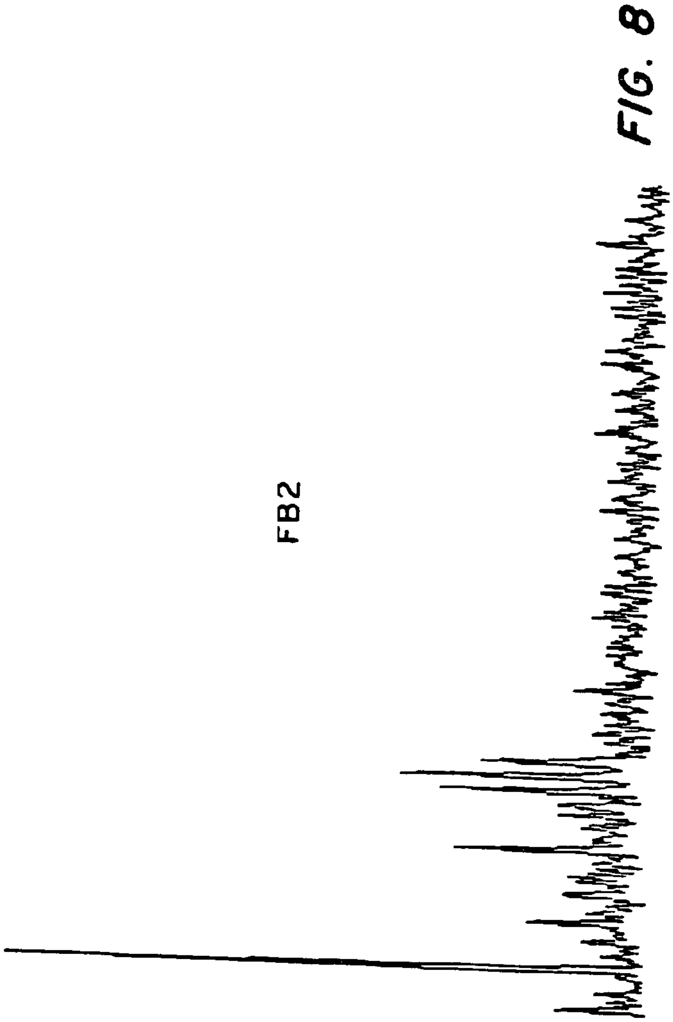
Figure 9:
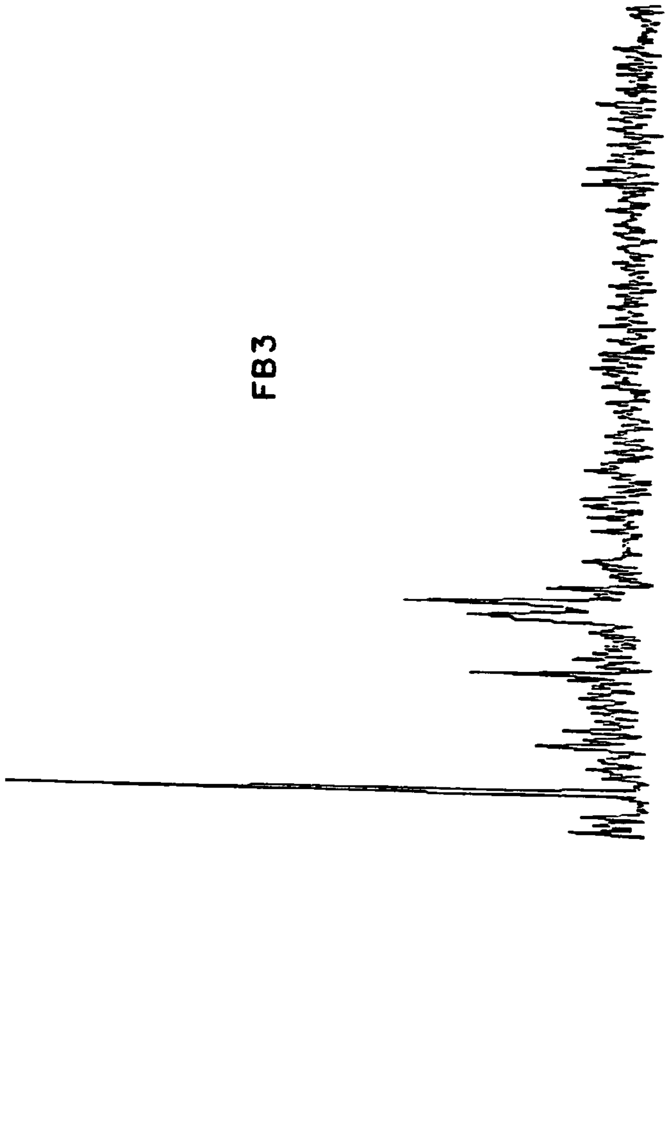

Thus, the digitized signals from A/D converters 14, 16 and 18 are windowed and transformed to a frequency domain by an overlapping fast Fourier transform (FFT) method as at 22, 24 and 26, respectively. Windowing is required to limit bin spreading in the frequency domain and overlapping is required to avoid time domain aliasing for reconstituted emitted signals. Thus, frequency domain signals are provided at 22, 24 and 26, and are designated as FB1, FB2 and FB3, respectively. The frequency domain signals are graphically illustrated in FIGS. 7, 8 and 9. In this regard, reference is made to FIG. 7 which illustrates the tonal and "pink" background noise characteristics of the windowed and transformed signals.

Figure 2:
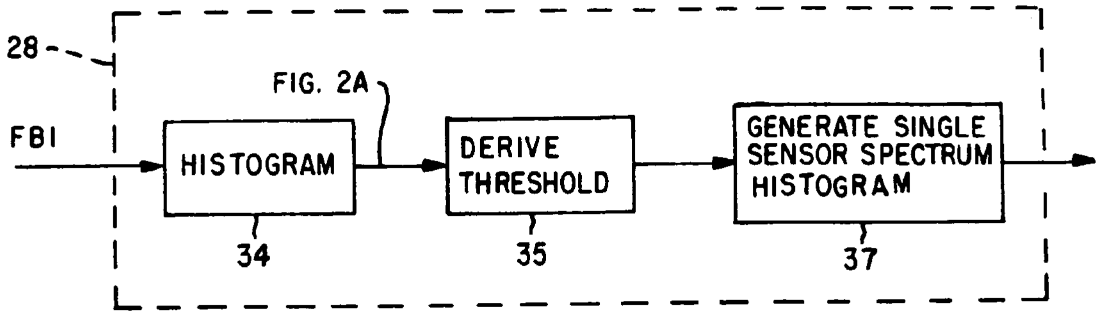
FIG. 2 is a flow chart particularly illustrating a tonal and noise suppression feature of the invention illustrated generally in FIG. 1.

In order to determine the upper levels (to eliminate strong tonals) and the lower levels (to discriminate emitted signals S1, S2 and S3 from background noise) thresholds, frequency domain signals FB1, FB2 and FB3 are processed for tonal and noise suppression at 28, 30 and 32, respectively. The tonal and noise suppression processing is more particularly illustrated in FIG. 2, wherein, for example, frequency domain signal FB1 is shown as being processed for tonal and noise suppression at 28.

Figure 2A:
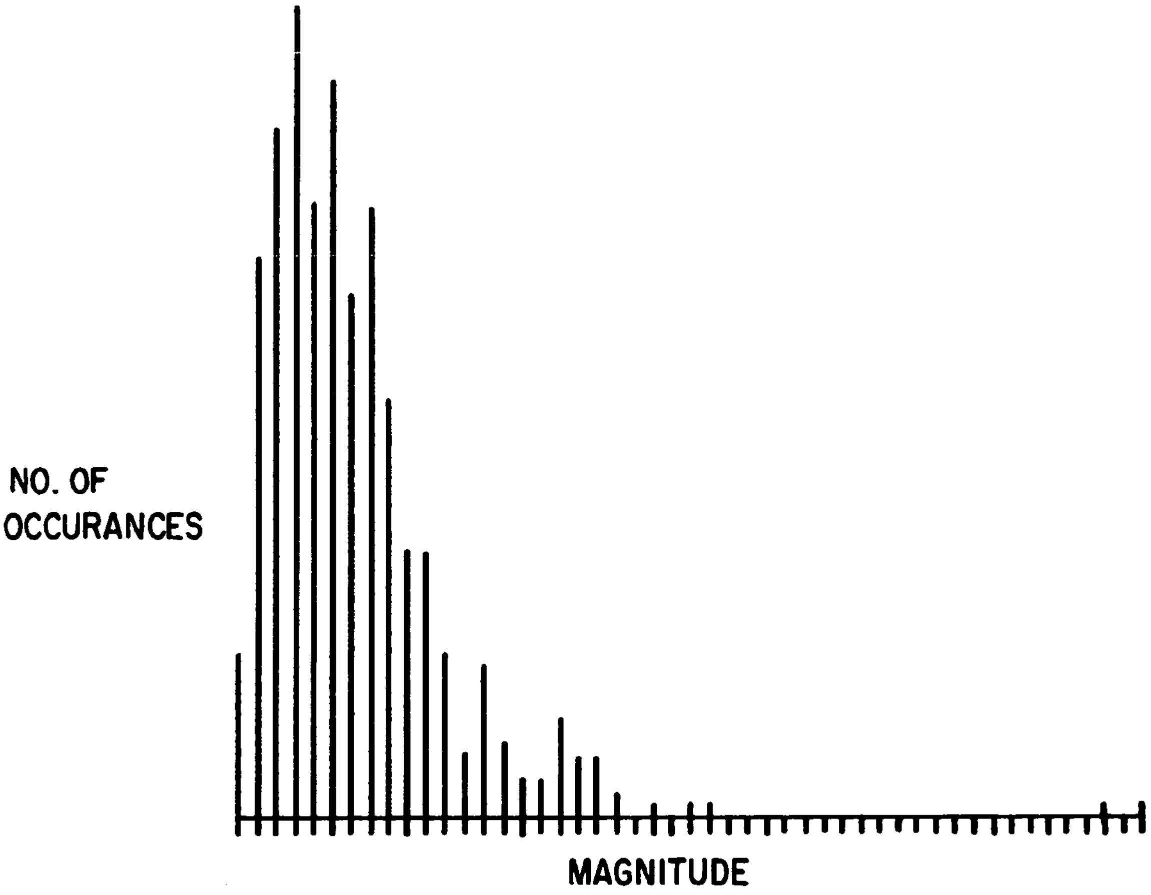
FIG. 2A is a magnitude histogram plot provided in accordance with the method of the invention.

Thus, the magnitude spectrum of signal FB1 is converted into a magnitude histogram plot at 34 and as illustrated in FIG. 2A. Since background noise exists for most frequency bins, the number of occurrences is concentrated in the lower portion of the histogram. It is known that background noise has a Gaussian distributed probability density function. The rules for the lower and upper level thresholds are derived at 35 (FIG. 2) from the magnitude histogram shown in FIG. 2A. The magnitude spectrum is filtered in the upper and lower thresholds resulting in a discovery band (1/0 bit pattern). A single sensor spectral histogram is generated at 37. Tonal and noise suppression is likewise performed for all of the frequency domain signals. To take into account the coherence property and multi-path delay effects of emitted signals S1, S2 and S3, the resulting discovery band of each of the respective sensors 2, 4 and 6 is integrated over both time and spatial (across sensors) domains, since the emitted signals have a strong correlation in both domains.

The tonal and noise suppressed outputs at 28, 30 and 32 (FIG. 1) are summed at 36 for developing a current spectral histogram at 38. The current spectral histogram at 38 is summed at 40 with a previous spectral histogram at 42 to provide a total spectral histogram at 44.

Figure 3:
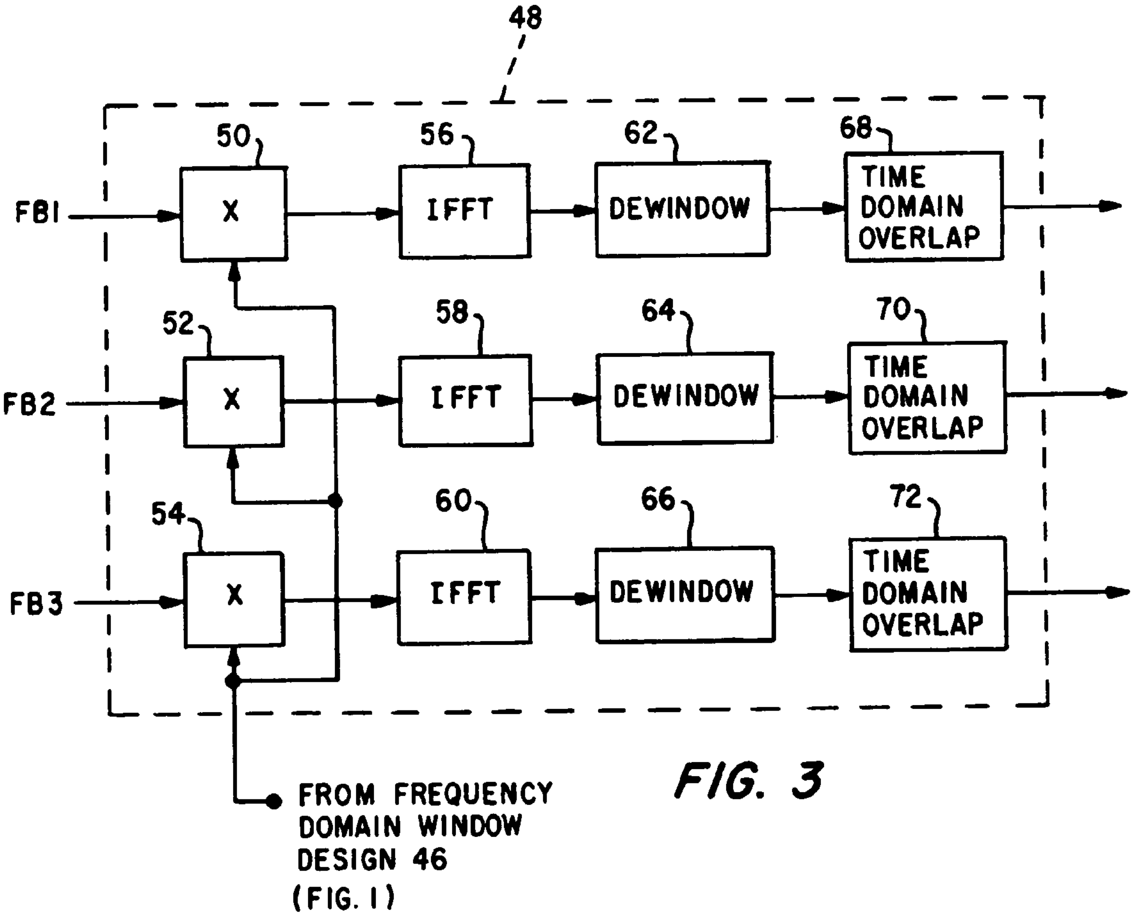
FIG. 3 is a flow chart particularly illustrating a filter bank illustrated generally in FIG. 1.
Figure 10:
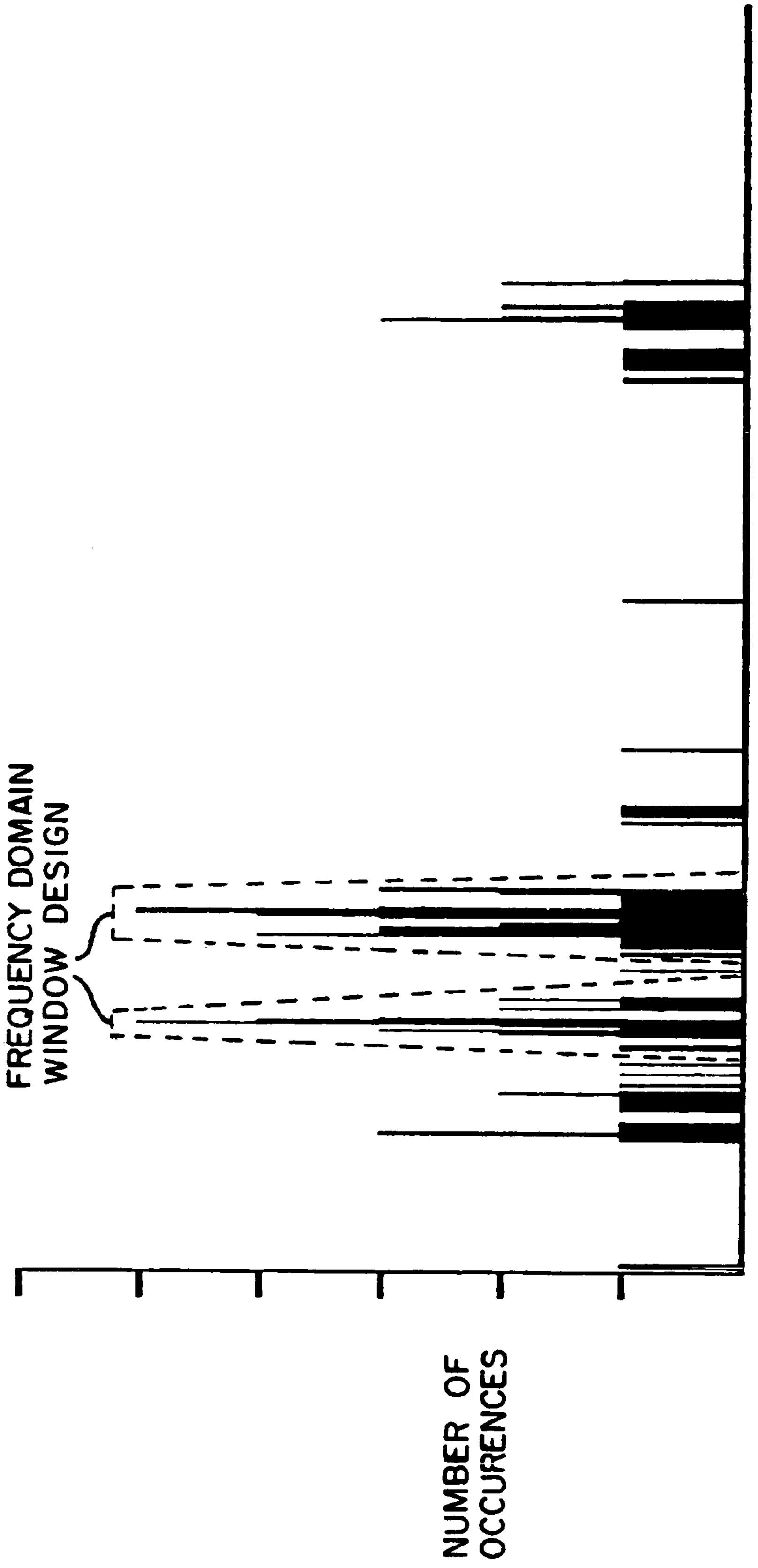
FIG. 10 is a diagrammatic representation of a total current histogram provided in accordance with the method of the invention.

A frequency domain window design is established at 46 with reference being made to FIG. 10, which illustrates the frequency domain window design. Thus, the frequency domain window can be designed according to the number of occurrences of certain frequency bins. The self-noise transient signals are not correlated among sensors in both the spacial and frequency domains. Therefore, in a high resolution spectrum such as herein encountered, the frequency bins of self-noise transient signals are likely to be ignored by the frequency domain window design. In this regard, and with reference to FIG. 1, the frequency domain window design shown in FIG. 10 is processed by a filter bank 48 as are frequency domain signals FB1, FB2 and FB3. Reference is made to FIG. 3 which more particularly shows the processing effected by filter bank 48.

Thus, signals FB1, FB2 and FB3 are multiplied at 50, 52 and 54, respectively, by the frequency domain window. In other words, the time domain and filter bank outputs for all of the sensors 2, 4 and 6 can be obtained by multiplying the corresponding frequency domain signals by the desired frequency domain windows and then taking inverse fast Fourier transforms (IFFT) at 56, 58 and 60, respectively. De-windowing is performed at 62, 64 and 66 and time domain overlapping is performed at 68, 70 and 72, whereby the accuracy of reconstituted output signals at 68, 70 and 72 is maintained.

Figure 11:
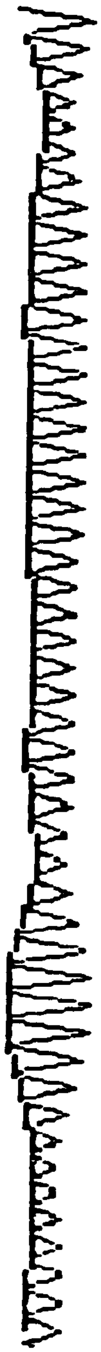
FIGS. 11, 11A; 12, 12A; and 13, 13A are diagrammatic representations of reconstituted signals provided by a filter bank shown generally in FIG. 1 and particularly shown in FIG. 3.
Figure 12:
Figure 13:
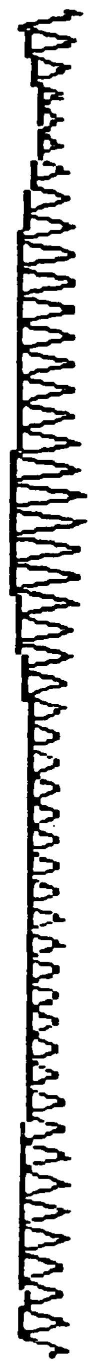
Figure 11A:
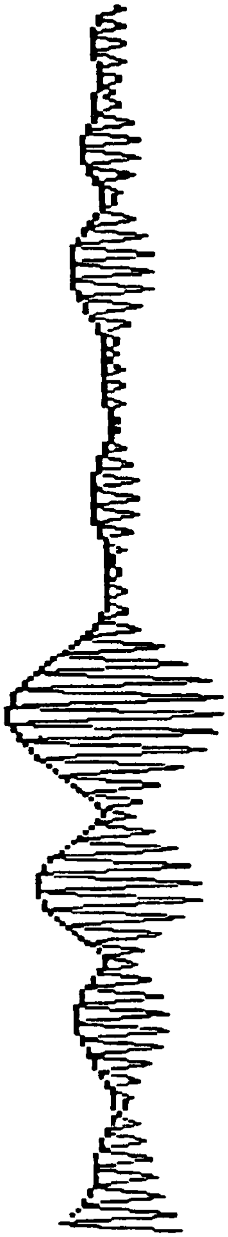
Figure 12A:
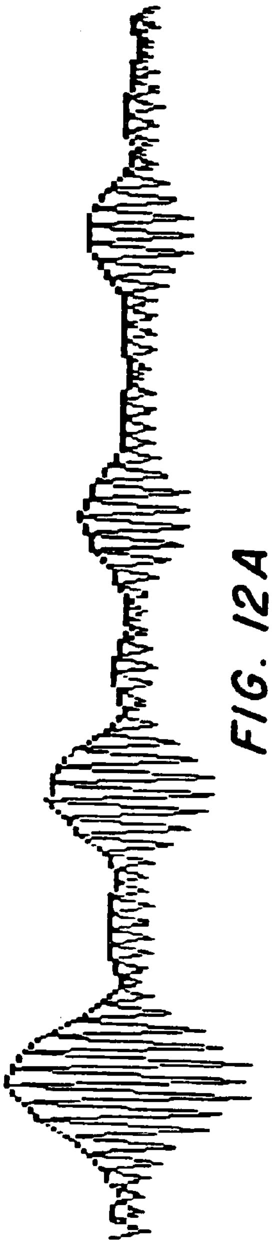
Figure 13A:
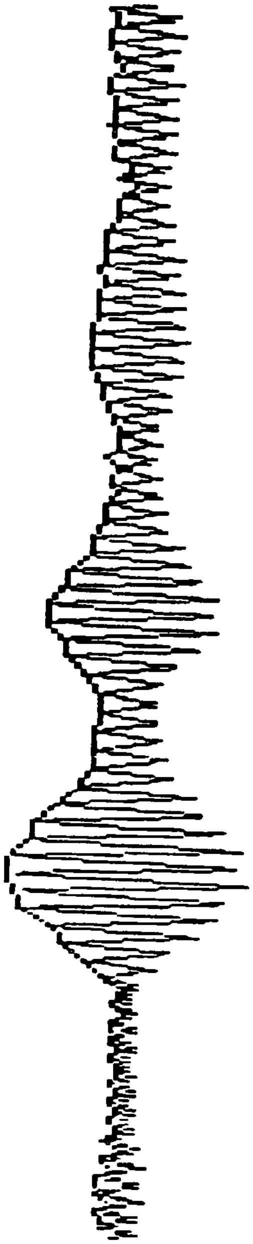

The reconstituted signal at 68 is illustrated in FIG. 11 and in FIG. 11A, which is an extension of FIG. 11; the reconstituted signal at 70 is illustrated in FIG. 12 and in FIG. 12A, which is an extension of FIG. 12; and the reconstituted signal at 72 is illustrated in FIG. 13 and in FIG. 13A, which is an extension of FIG. 13. The reconstituted signals are processed for time domain cross-correlation at 74, shown in FIG. 1, and the cross-correlated reconstituted signal thereby provided is identified at 76 and measured by a measurement unit 78.

It will be recognized that the advantages of the described method, which includes a digital adaptive tuning filter bank, include the ability to significantly increase the signal to noise ratio and to reduce the possibility of matching self-noise transient signals. This simplifies the design task for an emitted signal recognition unit and minimizes false alarm rates, as are likely to occur.

Figure 4:
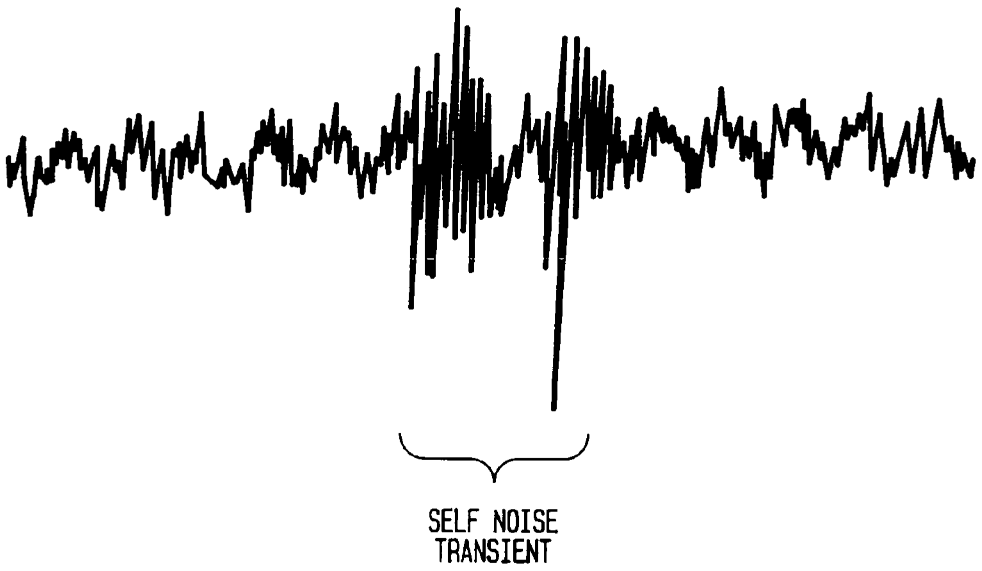
FIGS. 4, 5 and 6 are diagrammatic representations illustrating digitized, filtered sensor signals which are processed by the method of the invention.
Figure 5:
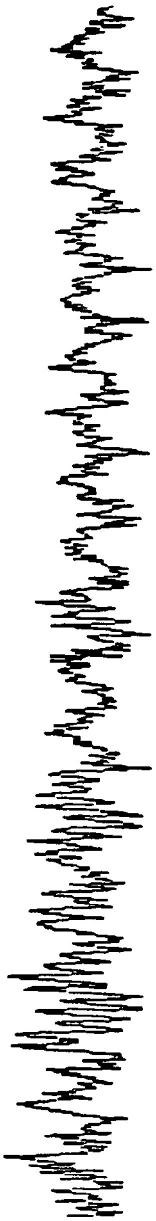
Figure 6:
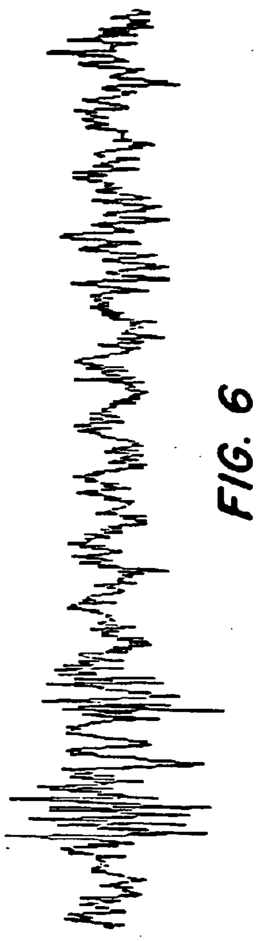

In summary, emitted signals S1, S2 and S3 are sensed by sensors 2, 4 and 6, respectively, and are thereafter digitized as shown in FIGS. 4, 5 and 6. Their magnitude spectra are demonstrated in FIGS. 7, 8 and 9, respectively. In this regard, it is to be noted that the signal to noise ratio for all sensors is less than −10 dB. Two of the outputs of the digital adaptive tuning filter bank for all three sensors are shown in FIGS. 11, 12 and 13 and in FIGS. 11A, 12A and 13A. It will be discerned that FIGS. 11, 12 and 13 portray steady weak tonals and FIGS. 11A, 12A and 13A are the desired emitted signals.

Although the invention has been shown and described with only three emitted signals S1, S2 and S3, any number of signals may be processed by the method of the invention as will now be understood by those skilled in the art.

With the above description of the invention in mind, reference is made to the claims appended hereto for a definition of the scope of the invention.

What is claimed is:

1. A method for detecting acoustic signals emitted from a signal source, comprising:
- sensing the emitted signals using a plurality of sensors and providing a plurality of analog acoustic signals;
- filtering the analog acoustic signals;
- converting the filtered signals to a corresponding plurality of digital signals;
- windowing and transforming the digital signals to a frequency domain and providing a corresponding plurality of frequency domain signals;
- suppressing tonal and noise characteristics of the frequency domain signals and providing a corresponding plurality of suppressed signals;
- combining the suppressed signals and providing a combined signal;
- developing a total spectral histogram from the combined signal;
- designing a frequency domain window from the total spectral histogram;
- combining the frequency domain window and the plurality of frequency domain signals in a frequency bin and providing a corresponding plurality of reconstituted emitted signals;
- time domain cross-correlating the reconstituted signals and providing a time domain cross-correlated signal;
- identifying the time domain cross-correlated signal; and
- measuring the identified signal.

2. A method as described by claim 1, wherein filtering the analog acoustic signals includes:
- filtering the analog acoustic signals for providing band selected/limited signals.

3. A method as described by claim 2, wherein:
- converting the filtered signals to a corresponding plurality of digital signals includes:
- the digital signals having self-noise, transient portions.

4. A method as described by claim 3, wherein transforming the digital signals to a frequency domain includes:

subjecting the digital signals to an overlapping fast Fourier transform.

5. A method as described by claim 4 wherein:

windowing the digital signals is effective for limiting bin spreading in the frequency domain and subjecting the digital signals to an overlapping fast Fourier transform is effective for avoiding time domain aliasing for the reconstituted emitted signals.

6. A method as described by claim 5, wherein suppressing tonal and noise characteristics of the frequency domain signals includes:

converting the magnitude spectrum of each of the plurality of frequency domain signals into a magnitude histogram;

deriving upper and lower threshold levels from the magnitude histogram; and generating a spectral histogram from the magnitude histogram and the threshold levels.

7. A method as described by claim 6, wherein developing a total spectral histogram from the combined signal includes:

developing spectral histograms from the combined signal; and combining a current spectral histogram with a previous spectral histogram for developing the total spectral histogram.

8. A method as described by claim 7, wherein designing a frequency domain window histogram from the total spectral histogram includes:

designing the total spectral histogram in accordance with the number of occurrences of certain frequency bins.

9. A method as described by claim 8, wherein combining the frequency domain window histogram and the plurality of frequency domain signals in a frequency bin and providing a corresponding plurality of reconstituted emitted signals includes:

combining each of the plurality of frequency domain signals with the frequency domain window and providing a corresponding plurality of combined signals;

subjecting each of the combined signals to an inverse fast Fourier transform;

de-windowing each of the inverse fast Fourier transformed signals; and time domain overlapping each of the de-windowed signals to provide the plurality of reconstituted emitted signals.

10. A method for detecting acoustic signals emitted from a signal source, wherein a plurality of sensors provides a corresponding plurality of analog acoustic signals and the acoustic signals are filtered and converted to a corresponding plurality of digital signals, said method comprising:

transforming the digital signals to a frequency domain and providing a corresponding plurality of frequency domain signals;

suppressing tonal and noise characteristics of the frequency domain signals and providing a corresponding plurality of suppressed signals;

developing a total spectral histogram from the suppressed signals;

designing a frequency domain window from the total spectral histogram;

combining the frequency domain window and the plurality of frequency domain signals in a frequency bin and providing a corresponding plurality of reconstituted emitted signals;

time domain cross-correlating the reconstituted signals and providing a time domain cross-correlated signal;

identifying the time domain cross-correlated signal; and measuring the identified signal.

11. A method as described by claim 10, wherein:

windowing the digital signals before transforming the signals to a frequency domain for limiting bin spreading in the frequency domain.

12. A method as described by claim 10, wherein transforming the digital signals to a frequency domain includes:

subjecting the digital signals to an overlapping fast Fourier transform.

13. A method as described by claim 11, wherein:

windowing the digital signals is effective for limiting bin spreading in the frequency domain and subjecting the digital signals to an overlapping fast Fourier transform is effective for avoiding time domain aliasing for the reconstituted emitted signals.

14. A method as described by claim 13, wherein suppressing tonal and noise characteristics of the frequency domain signals includes:

converting the magnitude spectrum of each of the plurality of frequency domain signals into a magnitude histogram;

deriving upper and lower threshold levels from the magnitude histogram; and generating a spectral histogram from the magnitude histogram and the threshold levels.

15. A method as described by claim 14, wherein developing a total spectral histogram from the suppressed signals includes:

combining the suppressed signals and providing a combined signal; and developing a total spectral histogram from the combined signal.

16. A method as described by claim 15, wherein developing a total spectral histogram from the combined signal includes:

developing spectral histograms from the combined signal; and combining a current spectral histogram with a previous spectral histogram for developing the total spectral histogram.

17. A method as described by claim 16, wherein designing a frequency domain histogram from the total spectral histogram includes:

designing the total spectral histogram in accordance with the number of occurrences of certain frequency bins.

* * * * *